United States Patent [19]

Georgiev

[11] Patent Number: 4,480,848
[45] Date of Patent: Nov. 6, 1984

[54] BICYCLE

[76] Inventor: Georgi D. Georgiev, 194a Royal York Rd., Etobicoke, Ontario M8V 2V6, Canada

[21] Appl. No.: 490,781
[22] Filed: May 2, 1983
[51] Int. Cl.³ .............................................. B62K 3/14
[52] U.S. Cl. .......................... 280/281 LP; 280/281 R
[58] Field of Search ....... 280/281 LP, 281 R, 281 W, 280/281 B, 261

[56] References Cited

U.S. PATENT DOCUMENTS

| 690,733 | 1/1902 | Jarvis | 280/281 LP |
| 2,147,732 | 2/1939 | Boynton | 280/281 LP |

FOREIGN PATENT DOCUMENTS

| 852545 | 10/1939 | France | 280/281 LP |
| 6748 | of 1896 | United Kingdom | 280/281 W |

Primary Examiner—Joseph F. Peters, Jr.
Assistant Examiner—Mitchell J. Hill
Attorney, Agent, or Firm—George A. Rolston

[57] ABSTRACT

A bicycle in which the frame is so constructed that the pedal crank is displaced forwardly of the center of the back wheel by a distance equal to at least twice the radius of the back wheel, and the rear frame member has a length equal to at least twice the radius of the back wheel, and the steering column housing is slanted at an angle of between 62° and 58° to the horizontal, and the saddle support column has a length equal to between 1.2 and 1.4 times the radius of the back wheel, and terminates at an upper end located approximately perpendicularly above the intersection between the rear frame support, and the periphery of the back wheel, and the saddle support column is slanted at a lesser angle than the steering column housing of between 40° and 44° to the horizontal, and including a back rest extending upwardly behind the saddle.

2 Claims, 2 Drawing Figures

BICYCLE

The invention relates to bicycles, and in particular, to a bicycle having a geometry which provides for a more efficient use of muscle power.

The conventional bicycle design provides for a riding position in which the body is located almost perpendicularly above the pedals, and the handlebars are located some distance ahead of the body.

This provides a compact design for the bicycle frame, and has long been accepted as the norm.

However, when it is considered from various different viewpoints, it is quite apparent that the body position provided on the conventional bicycle frame is both inefficient and unsafe. The body position on such a conventional frame is inefficient since the application of muscle power to the pedals, when the body is located almost perpendicularly above the pedals, depends entirely on the weight of the body. In addition, the muscle power that can be applied from an upright position is dependent mainly on the contraction of the leg muscles. Other muscles take little part in the pedalling action.

In addition, the body is located in a relatively elevated position, such that it creates substantial wind resistance.

In order to overcome this, dropped handlebars are provided in sporting and racing bicycles. This, however, results in an awkward riding position, in which the torso of the body is inclined almost horizontal, and the head and neck must then be craned upwardly in order to see the road. In addition to these factors, the riding position on the conventional bicycle is unsafe. This arises because in order to achieve any degree of efficiency at all in pedalling action, it is necessary to adjust the height of the saddle, so that the saddle is at a distance from the bottom dead centre position of the pedals, which is more or less equal to the length of the leg of the rider.

This means that the rider's feet cannot touch the ground when he is sitting on the saddle.

It is thus necessary for the rider to slip forwardly off the saddle in order to allow the bicycle to come to rest without falling over.

The elevation of the saddle means that the centre of gravity of the rider is at an undue height resulting in instability.

Dropped handle bars also impair breathing efficiency since the forward inclination of the torso closes the diaphragm.

From this analysis it is apparent that it is desirable from the viewpoint both of efficiency, and also from the viewpoint of safety and comfort, that the geometry of the bicycle frame be rearranged so as to as far as possible maximize the efficient use of muscle power, and at the same time to as far as possible reduce the hazardous aspects inherent in the conventional bicycle design.

BRIEF SUMMARY OF THE INVENTION

With a view of overcoming these problems, and to maximizing both efficiency and safety, the invention comprises a bicycle having front and back wheels, pedal crank means and transmission means connected to the back wheel, whereby muscle power can be applied to the back wheel, a steering column housing sleeve at the front of such frame, a steering column rotatively mounted in such sleeve, and front wheel forks attached to such steering column for supporting a front wheel, a lower front frame piece extending between said steering column housing and said pedal crank, a rear frame support member extending rearwardly from such pedal crank for supporting such back wheel, a saddle support column extending upwardly and rearwardly from such pedal crank at an angle of between 40° and 44° to the horizontal, and a saddle mounting tube extending telescopically therefrom, a rear upper frame member extending from the termination of such lower rear frame member to said saddle support column, and an upper front frame member extending from such saddle support column to such steering column housing, and wherein such steering column housing is slanted at an angle of between 62° and 58° to the horizontal, such saddle support column being thus located at a lesser angle than such steering column housing, whereby extension of such saddle mounting tube from such column will displace the saddle rearwardly and away from such pedal crank without substantially increasing its height from the ground, and including back rest means extending upwardly behind such saddle, and adjustable support means for such back rest means.

More particularly, the invention comprises such a bicycle having handlebars elevated above the height of such saddle and extending rearwardly of such housing, and wherein the lower rear frame member is equal to about two times the radius of the rear wheel, and wherein the upper rear frame member is equal to approximately between 1.1 and 1.3 times the radius of the wheel, thereby displacing the rear wheel rearwardly of the pedal crank by a distance at least equal to twice the radius of the rear wheel, and locating the saddle at least partially over the rear wheel, such back rest means being mounted behind the saddle, and being adjustable for height, in response to adjustments in the distance of the saddle from the pedal crank.

It is a further and related objective of the invention to provide such a bicycle, wherein the front forks are curved forwardly, and displace the front wheel forwardly of the axis of the steering column, such that the axis of the steering column when projected through the wheel, would define a chord of the wheel perimeter, equal to about one-third of such perimeter.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

Figure 1:
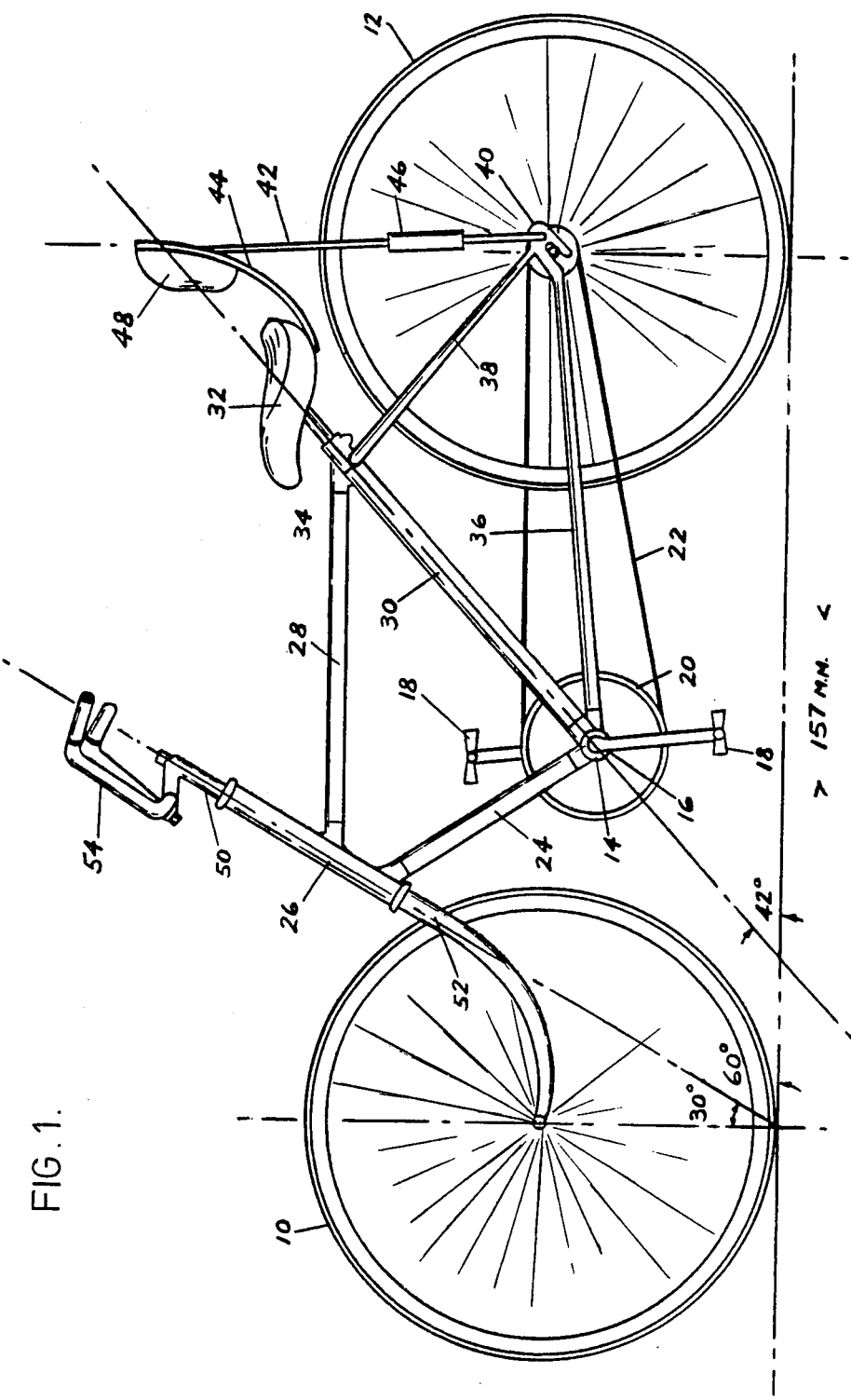
FIG. 1 is a side elevational view of a bicycle according to the invention.

Referring now to the bicycle of FIG. 1, this is illustrated as having front and back wheels 10 and 12 of equal size. It will be noted that the wheel base, i.e. the distance between the centers of the two wheels, is somewhat longer than the wheel base of the conventional bicycle, for reasons that will appear below.

The bicycle frame comprises a pedal crank support 14, supporting the conventional pedal crank 16 and pedals 18.

The pedal crank 16 drives a drive sprocket 20, driving a chain 22 in the conventional manner.

It will, of course, be appreciated that the invention is not restricted solely to bicycles driven by sprockets and chains, but comprehends other forms of drive mechanism if they should prove satisfactory. The frame further comprises a lower front member 24 extending at a forward and upward angle from the pedal crank for housing 14. The lower front frame member 24 is joined to the lower end of a steering column housing tube 26. An upper front frame member 28 extends rearwardly from the steering column housing tube 26.

A saddle support column 30 extends rearwardly at an extreme angle of rake, extending from the pedal crank 14 to the rear end of the upper frame member 28.

A saddle 32 is supported on a conventional adjustable saddle post 34 extending from column 30.

A lower rear frame member 36 extends rearwardly from the pedal crank 14. An upper rear frame member 38 extends downwardly from the upper end of support column 30. A conventional rear wheel mounting 40 is provided at the junction between the rear frame members 36 and 38.

In order to provide support for the back of the rider, a vertical back bracing member 42 extends upwardly from the junction of rear frame members 36 and 38, and a rearwardly and upwardly angled strut 44 extends from the underside of the saddle 32.

Preferably, the brace 42 will be adjustably extendable in any suitable manner such as telescopically or the like as at 46.

A back support pad 48 is mounted at the juncture of bracing member 42 and strut 44, and is positioned so as to contact the small of the back of the rider, when seated on the saddle.

A steering column 50 is rotatively supported in the steering column support housing 26, and has a pair of front forks 52 at the lower end. The front forks 52 are curved in an arcuate manner and extend forwardly a substantial distance, so as to displace the center of the wheel 10 substantially forwardly of the axis of the steering column 50.

Preferably, the axis of the steering column 50 defines a chord relative to the perimeter of the wheel 10 equal to about one-third of the perimeter.

The steering column 50 is displaced at an angle of about 60° to the horizontal, thus locating the front wheel well in front of the pedal crank. In order to achieve stability, in a bicycle having wheels of about the same size the axis of the steering column and a vertical axis passing through the front wheel hub must intersect approximately at the point where the front wheel contacts the road.

Handlebars 54 are located at the upper end of column 50, and extend rearwardly over the upper frame member 28, so that they may easily be grasped by a person seated on saddle 32.

It will thus be seen that the riding position of such bicycle is substantially different from that of the conventional bicycle. The rider's legs extend at a forward angle relative to the body, and the torso is maintained more or less upright, or can, in fact, lean slightly backwards against the back support 48.

Two factors in the frame are of particular importance in achieving this desirable objective.

The lower rear frame member 36 will be seen to have a length of approximately twice the radius of the rear wheel 12. This effectively displaces the pedal crank 14 substantially forwardly of the rear wheel 12, by the same distance.

The saddle support column 30 will be seen to terminate at its upper end, at a point which is approximately perpendicularly above the intersection of the lower support frame 36 and the perimeter of the rear wheel 12. This, of course, is achieved by making the saddle support column 30 equal to about between 1.2 and 1.4 times the radius of the rear wheel 12.

This locates the saddle over the rear wheel, but forwardly of its hub which is at the point 40.

The height of the saddle relative to the road is less than the distance between the saddle and the pedal crank. This means that when the saddle 32 is adjusted to the correct distance from the pedal crank, so as to maximize pedalling efficiency by the rider, the rider is still able to touch the ground with his feet without slipping off the saddle.

This substantially improves rider safety.

In addition, the center of gravity of the rider is lowered, and the riding position is improved since it is not necessary for the rider to crane his head upwardly to see the road. Breathing is also improved.

However, the most significant advantage achieved by the invention is the fact that the rider is able to apply muscle power with greater efficiency. This arises because the back support 48 provides a pressure pad against which the rider can exert his leg muscles, and can also bring some power from the back muscles into play as well. He is not simply dependent on his own weight being applied through the medium of the leg muscles, as in the conventional bicycle.

In addition, the rider is grasping the handlebars 54, and is thus able to exert additional muscle power, all of which greatly increases pedalling efficiency.

Figure 2:
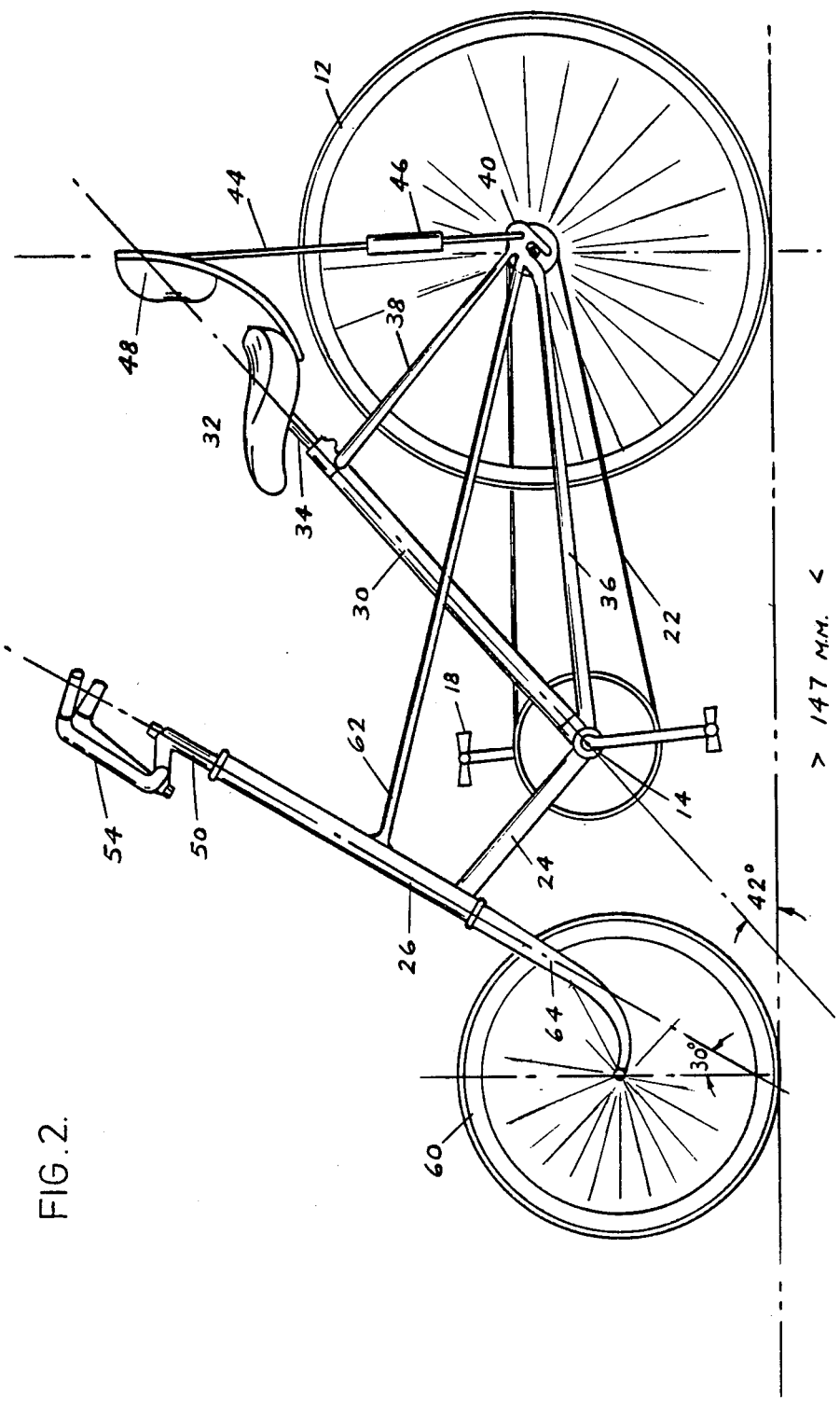
FIG. 2 is a side elevation of an alternate embodiment of the invention.

According to a further embodiment of the invention as illustrated in FIG. 2, a somewhat different performance can be achieved using a smaller diameter front wheel 60. In FIG. 2 the frame has the same basic characteristics as in FIG. 1 except that the upper front frame member 62 extends from the housing 26 to the rear wheel hub 40.

The geometry of the front forks is somewhat different. The steering column also is raked at an angle of 60° to the horizontal. However, its axis meets the central vertical axis of the wheel 60 a distance above the point of wheel contact. This is due to the somewhat shorter front fork 64. The chord of the steering column axis on the wheel 60 is also somewhat less than one third of its perimeter.

This results in a somewhat shorter wheelbase and is found to produce greater manoeuverability than the embodiment of FIG. 1.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A bicycle having front and back wheels, pedal crank and transmission means connected to the back wheel, whereby muscle power can be applied to the back wheel, a steering column housing at the front of such frame, a steering column rotatively mounted in said housing, and front wheel forks attached to said steering column for supporting a front wheel, a lower front frame piece extending between said steering column housing and said pedal crank, a lower rear frame member extending rearwardly from said pedal crank for supporting said back wheel, a saddle support column extending upwardly and rearwardly from said pedal crank, and a saddle post extending upwardly from said saddle support column, an upper rear frame member extending from the termination of said lower rear frame member extending from the termination of said lower rear frame member to said saddle support column, and an upper front frame member extending from said saddle support column to said steering column housing, and wherein the improvement comprises that;

said pedal crank is displaced forwardly of the centre of said back wheel by a distance equal to at least twice the radius of said back wheel, and that said lower rear frame member has a length equal to at least twice the radius of said back wheel, and that said steering column housing is slanted at an angle of between 62° and 58° to the horizontal, and that said saddle support column has a length equal to between 1.2 and 1.4 times the radius of said back wheel, and terminates at an upper end located approximately perpendicularly above the intersection between said lower rear frame member, and the periphery of said back wheel, and that said saddle support column is slanted at a lesser angle than said steering column housing of between 40° and 44° to the horizontal, whereby extension of said saddle post from said saddle support column will displace the saddle rearwardly away from said pedal crank and from said steering column housing while minimizing the increase in height of said saddle from the ground, and that said back wheel and said front wheel are of the same diameter, and wherein said front wheel forks have lower end portions which are curved forwardly, with said front wheel located at the forward terminal points of said front forks, said curved portion of said front forks being of such length that a perpendicular line through the hub of said front wheel will intersect the axis of said steering column at about the point where said front wheel touches the ground, and including back rest means extending upwardly behind said saddle, and adjustable support means for said back rest means.

2. A bicycle having front and back wheels, pedal crank and transmission means connected to the back wheel, whereby muscle power can be applied to the back wheel, a steering column housing at the front of such frame, a steering column rotatively mounted in said housing, and front wheel forks attached to said steering column for supporting a front wheel, a lower front frame piece extending between said steering column housing and said pedal crank, a lower rear frame member extending rearwardly from said pedal crank for supporting said back wheel, a saddle support column extending upwardly and rearwardly from said pedal crank, and a saddle post extending upwardly from said saddle support column, an upper rear frame member extending from the termination of said lower rear frame member extending from the termination of said lower rear frame member to said saddle support column, and an upper front frame member extending from said saddle support column to said steering column housing, and wherein the improvement comprises that;

said pedal crank is displaced forwardly of the centre of said back wheel by a distance equal to at least twice the radius of said back wheel, and that said lower rear frame member has a length equal to at least twice the radius of said back wheel, and that said steering column housing is slanted at an angle of between 62° and 58° to the horizontal, and that said saddle support column has a length equal to between 1.2 and 1.4 times the radius of said back wheel, and terminates at an upper end located approximately perpendicularly above the intersection between said lower rear frame member, and the periphery of said back wheel, and that said saddle support column is slanted at a lesser angle than said steering column housing of between 40° and 44° to the horizontal, whereby extension of said saddle post from said saddle support column will displace the saddle rearwardly away from said pedal crank and from said steering column housing while minimizing the increase in height of said saddle from the ground, and wherein said front wheel is of a smaller diameter than said back wheel, and wherein said front wheel forks have a lower portion which is curved forwardly, with said front wheel being located with its hub at the termination of said front forks, and wherein a perpendicular line through said hub of said front wheel will intersect the axis of said steering column at a point above the point at which said front wheel touches the ground.

* * * * *